Patented June 8, 1954

2,680,749

UNITED STATES PATENT OFFICE 2,680,749

WATER-SOLUBLE TOCOPHEROL DERIVATIVES

John D. Cawley and Max H. Stern, Rochester, N. Y., assignors to Eastman Kodak Company, Rochester, N. Y., a corporation of New Jersey No Drawing. Application December 1, 1951, Serial No. 259,506

10 Claims. (Cl. 260—345.5)

This invention relates to water-soluble tocopherol derivatives.

The tocopherols, which occur in nature as α-tocopherol, β-tocopherol, γ-tocopherol and δ-tocopherol, are fat soluble materials exhibiting vitamin E biological activity. The tocopherols and tocopheryl esters, such as the tocopheryl acetate, palmitate and the like, are normally water-insoluble, however, which limits their admixture with other materials in aqueous media and also limits their usefulness for parenteral injection. Oil solutions of tocopherols are not readily adapted for intramuscular injection, for example, because of the danger of a "foreign body reaction" in the muscle due to the oily vehicle.

Three of the primary requisites of any tocopherol preparation suitable for parenteral injection are that the tocopherol material must be readily water soluble, the preparation must maintain a high degree of vitamin E biological activity, and the preparation must be non-toxic under normal conditions of use. Prior to this invention there was no tocopherol preparation commercially available which fulfilled these requisites to the desired degree.

It is accordingly an object of this invention to provide new water-soluble tocopherol derivatives.

It is also an object of this invention to provide water-soluble tocopherol material characterized by high vitamin E biological activity.

It is a further object of this invention to provide water-soluble tocopherol preparations characterized by the absence of objectionable toxicity under normal conditions of use.

Another object of the invention is to provide improved vitamin E-active material suitable for either oral or parenteral administration.

Another object of the invention is to provide new tocopherol derivatives which, upon parenteral injection, exhibit a higher degree of vitamin E biological activity than free tocopherol itself.

Another object of the invention is to make possible the direct parenteral administration of large amounts of vitamin E-active material.

Another object of the invention is to broaden the field of vitamin E use by providing effective means for solubilizing the normally fat-soluble but water-insoluble tocopherols.

Another object of the invention is to provide hitherto unknown vitamin E-active materials having unexpectedly high biological activity.

Another object of the invention is to facilitate treatment with fat-soluble tocopherols by providing tocopherol compositions in more readily usable form.

Other objects will be apparent from the description and claims which follow.

These and other objects are attained by means of this invention which comprises providing water-soluble vitamin E-active polyethylene glycol esters of tocopheryl acid esters by esterification of tocopheryl acid esters with polyethylene glycol.

The invention is applicable for providing water-soluble derivatives of any of the well-known vitamin E-active tocopherols including α-tocopherol, β-tocopherol, γ-tocopherol, δ-tocopherol and the corresponding tocopheryl hydroquinones, either in pure form or in mixtures of derivatives of two or more of such tocopherols, and including derivatives of both natural and synthetic tocopherols. The invention is of particular importance in connection with the water-soluble derivatives of α-tocopherol, including the naturally-occurring d-α-tocopherol and the synthetic d,l-α-tocopherol, the α-tocopherols exhibiting higher biological activity than the other tocopherols.

The water-soluble tocopherol derivatives embodying this invention can be prepared by esterifying any of the tocopheryl acid esters with polyethylene glycol. Thus the tocopheryl acid esters which are suitable include any of the acid esters of any of the well-known tocopherols and including the tocopheryl hydroquinones with any of the well-known polybasic acids, typical acid esters of tocopherol being the tocopheryl acid succinates, tocopheryl acid citraconates, tocopheryl acid α-methyl citraconates, tocopheryl acid itaconates, tocopheryl acid maleates, tocopheryl acid glutaconates, tocopheryl acid phthalates, and similar well-known tocopheryl acid carboxylates. The tocopheryl acid esters can be prepared by any of the well-known procedures for making acid esters of hydroxylic compounds, a preferred method being to react a tocopherol with a suitable polybasic acid anhydride under usual esterification conditions as illustrated in the specific examples.

The tocopheryl acid esters are then esterified with polyethylene glycol in accordance with well-known esterification techniques. The polyethylene glycol employed desirably has a molecular weight of at least 600 to give products having good water solubility, although polyethylene glycols having molecular weights as low as 400 can be employed where water solubilities of less than about 1% by weight are suitable. Highly water soluble products are obtained with any of the polyethylene glycols having molecular weights above 600 and derivatives have been made with polyethylene glycols having molecular weights of 6000 or more. In order to obtain highly potent tocopherol preparations without too high a percentage of inactive component, however, the polyethylene glycol desirably has a molecular weight not substantially higher than about 2000, with materials having molecular weights in the range of 600 to 1500 being preferred.

The esterification of the tocopheryl acid ester with the polyethylene glycol is desirably effected in solvent media, with any of the well-known organic solvents such as toluene, ethylene dichloride, benzene, naphtha or similar solvents which do not esterify being suitable. The esterification is promoted by inclusion in the reaction mixture of an esterification catalyst, p-toluenesulfonic acid, oxalic acid, hydrochloric acid, trichloroacetic acid and similar well-known acidic catalysts being typical of suitable catalysts. The esterification is desirably effected at elevated temperatures with the water formed during the esterification being removed by azeotropic distillation during the course of the esterification.

Most of the commercially available polyethylene glycol compositions are mixtures of materials of varying molecular weights and are furnished on the basis of the average molecular weight of the composition. Best results are obtained by distilling, solvent extracting or otherwise separating the low molecular weight components of such mixtures from the bulk of the mixture since the components below a molecular weight of 600 and particularly below 400 lessen the water solubility of the final ester. Thus, for example, it is desirable to distill a polyethylene glycol composition having an average molecular weight of 1000 to remove about 15% by weight of the low boiling components, such distillation being readily effected in a high vacuum centrifugal still at a pressure of 10 microns Hg or lower. Alternatively, the commercial polyethylene glycol compositions can be employed directly for esterification and the resulting product solvent extracted with petroleum ether or a mixture of 20% by weight of benzene with 80% by weight of petroleum ether to extract out the less water-soluble components, or the desired product can be crystallized out of a suitable solvent such as ethanol or isopropanol.

The tocopherol derivatives embodying this invention can be employed to form clear solutions containing as much as 25% or more by weight of such tocopherol derivative. The water solutions of the tocopherol derivatives can be used for either oral or parenteral administration. In the case of parenteral injection, the results obtained are particularly unexpected since the derivatives embodying this invention, when injected in water solution, exhibit nearly twice the biological activity of α-tocopherol which is orally administered and about 14 times the activity of α-tocopherol when the α-tocopherol is injected as an oily concentrate.

The preparation of tocopherol derivatives embodying the invention is illustrated in the following examples of preferred embodiments, it being understood that similar results are obtained by esterification of any of the tocopheryl acid esters with other polyethylene glycols.

*Example 1*

One hundred thirty-one grams of a tocopherol concentrate containing 51.7% by weight of α-tocopherol was heated for four hours at 90° C. with 74 g. of succinic anhydride. The resulting reaction product was diluted with 220 cc. of ethyl ether and allowed to stand for 15 hours at 3° C. to precipitate unreacted succinic anhydride. The precipitated succinic anhydride was then filtered out, and the filtrate diluted with ether, washed successively with dilute hydrochloric acid and water, and dried. The ether was distilled off and 150 g. of a dark oily residue was obtained. This residue was dissolved in 650 cc. of petroleum ether and chromatographed to remove impurities. The strongly adsorbed α-tocopheryl acid succinate was eluted with ethyl ether and the ether removed by evaporation to give 85 g. of α-tocopheryl acid succinate product which was then crystallized from petroleum ether to give 65 g. of α-tocopheryl acid succinate as needle-like crystals having a melting point of 76–77° C. Other acid carboxylates are readily prepared in similar fashion with other polybasic acid anhydrides and α-tocopherol or any of the other well-known tocopherols or mixtures of tocopherols.

*Example 2*

Ten grams of a commercial polyethylene glycol composition having an average molecular weight of 1000 was mixed with 5.6 g. of α-tocopheryl acid succinate in a reaction flask containing 100 cc. of toluene and a solution of 0.2 g. of p-toluene sulfonic acid in 0.2 cc. of water. The mixture was heated for 2 hours under conditions such that the water formed during the esterification was removed by azeotropic distillation. The solvent was removed from the resulting esterification product by evaporation under vacuum to give 15.9 g. of a concentrate of polyethylene glycol acid succinate of α-tocopherol as a tan-colored oil. This oil readily dissolved in water to form a 10% aqueous solution.

*Example 3*

A crude concentrate, such as prepared in the preceding example, was extracted with petroleum ether containing 20% by weight of benzene whereby approximately 15% by weight of the low molecular weight and less water-soluble components were extracted out of the concentrate. The resulting polyethylene glycol acid succinate of α-tocopherol had $$E^{1\%}_{1\,cm.}\,(284\,m\mu)=11$$

and was soluble in water to the extent of 20–25% by weight to give a clear limpid solution. If desired the tocopherol derivatives embodying the invention can be further purified by fractional crystallization in accordance with known procedures to give water-soluble solid products.

*Example 4*

Equimolar proportions of polyethylene glycol having a molecular weight of 400 and α-tocopheryl acid succinate were reacted as described to esterify the acid succinate. The crude product obtained thereby was a straw-colored oil having $$E^{1\%}_{1\,cm.}\,(284\,m\mu)=20$$

soluble in water to the extent of about 1%.

Similar results are obtained with other polyethylene glycols having molecular weights of from 600 to 6000, the glycols having a molecular weight of at least 600 being preferred from the solubility standpoint.

The invention thus provides water-soluble vitamin E-active tocopherol derivatives which are eminently suitable for parenteral administration in contrast to the fat-soluble but water-insoluble tocopherols themselves.

Although the invention has been described in considerable detail with reference to certain preferred embodiments thereof, it will be understood that variations and modifications can be effected within the spirit and scope of the invention as described hereinabove and as defined in the appended claims.

We claim:

1. A water-soluble vitamin E-active polyethylene glycol ester of a vitamin E-active tocopheryl acid ester of a dicarboxylic acid, the polyethylene glycol moiety of said ester having a molecular weight in the range from 400 to 6000.

2. A water-soluble vitamin E-active ester obtained as the product of esterification of a polyethylene glycol having a molecular weight in the range of from 600 to 6000 with an acid ester of a dicarboxylic acid and a tocopherol selected from the group consisting of alpha-tocopherol, beta-tocopherol, gamma-tocopherol and delta-tocopherol.

3. A water-soluble vitamin E-active polyethylene glycol ester of α-tocopheryl acid ester, said ester being the product obtained by the esterification of an α-tocopheryl acid ester of a dicarboxyl acid with a polyethylene glycol having a molecular weight of at least 600 and not more than 6000.

4. A water-soluble vitamin E-active polyethylene glycol ester of an acid succinate, of a tocopherol selected from the group consisting of alpha-tocopherol, beta-tocopherol, gamma-tocopherol and delta-tocopherol, the polyethylene glycol moiety of said ester having a molecular weight in the range from 400 to 6000.

5. A water-soluble vitamin E-active polyethylene glycol ester of an acid succinate of tocopheryl hydroquinone, said ester being obtained by esterification of a vitamin E-active tocopheryl hydroquinone acid succinate with a polyethylene glycol having a molecular weight of at least 600 and not more than 6000.

6. A water-soluble vitamin E-active polyethylene glycol ester of a α-tocopheryl acid succinate, said ester being the product obtained by esterification of α-tocopheryl acid succinate with a polyethylene glycol having a molecular weight in the range from 400 to 6000.

7. A water-soluble vitamin E-active polyethylene glycol ester of an acid ester of tocopherol and a dicarboxylic acid and being the product obtained by esterification of a tocopheryl dicarboxylic acid ester selected from the group consisting of acid esters of alpha tocopherol, beta tocopherol, gamma tocopherol and delta tocopherol with a polyethylene glycol having a molecular weight in the range of 600–2000.

8. A water-soluble vitamin E-active polyethylene glycol ester of a dicarboxylic acid ester of α-tocopherol and corresponding to the product obtained by the esterification of an α-tocopheryl acid ester of a dicarboxylic acid with a polyethylene glycol having a molecular weight in the range of 600–2000.

9. A water-soluble vitamin E-active polyethylene glycol ester of an acid succinate of tocopherol selected from the group consisting of alpha tocopherol, beta tocopherol, gamma tocopherol and delta tocopherol and being the product obtained by esterification of a tocopheryl acid succinate with a polyethylene glycol having a molecular weight in the range of 600–2000.

10. A water-soluble vitamin E-active polyethylene glycol ester of an acid succinate of a α-tocopherol, the polyethylene glycol moiety of said ester having a molecular weight in the range of 600–2000.

No references cited.